Oct. 3, 1950     A. D. ADAMOPOULOS     2,524,646
NUT CRACKING MACHINE

Filed July 21, 1947                            4 Sheets-Sheet 1

Inventor
Aristomenes D. Adamopoulos
By: Dunning & Dunning attys.

Oct. 3, 1950     A. D. ADAMOPOULOS     2,524,646
NUT CRACKING MACHINE

Filed July 21, 1947     4 Sheets-Sheet 2

Oct. 3, 1950 A. D. ADAMOPOULOS 2,524,646
NUT CRACKING MACHINE
Filed July 21, 1947 4 Sheets-Sheet 3

INVENTOR.
Aristomenes D.
Adamopoulos
By: Banning & Banning
attys.

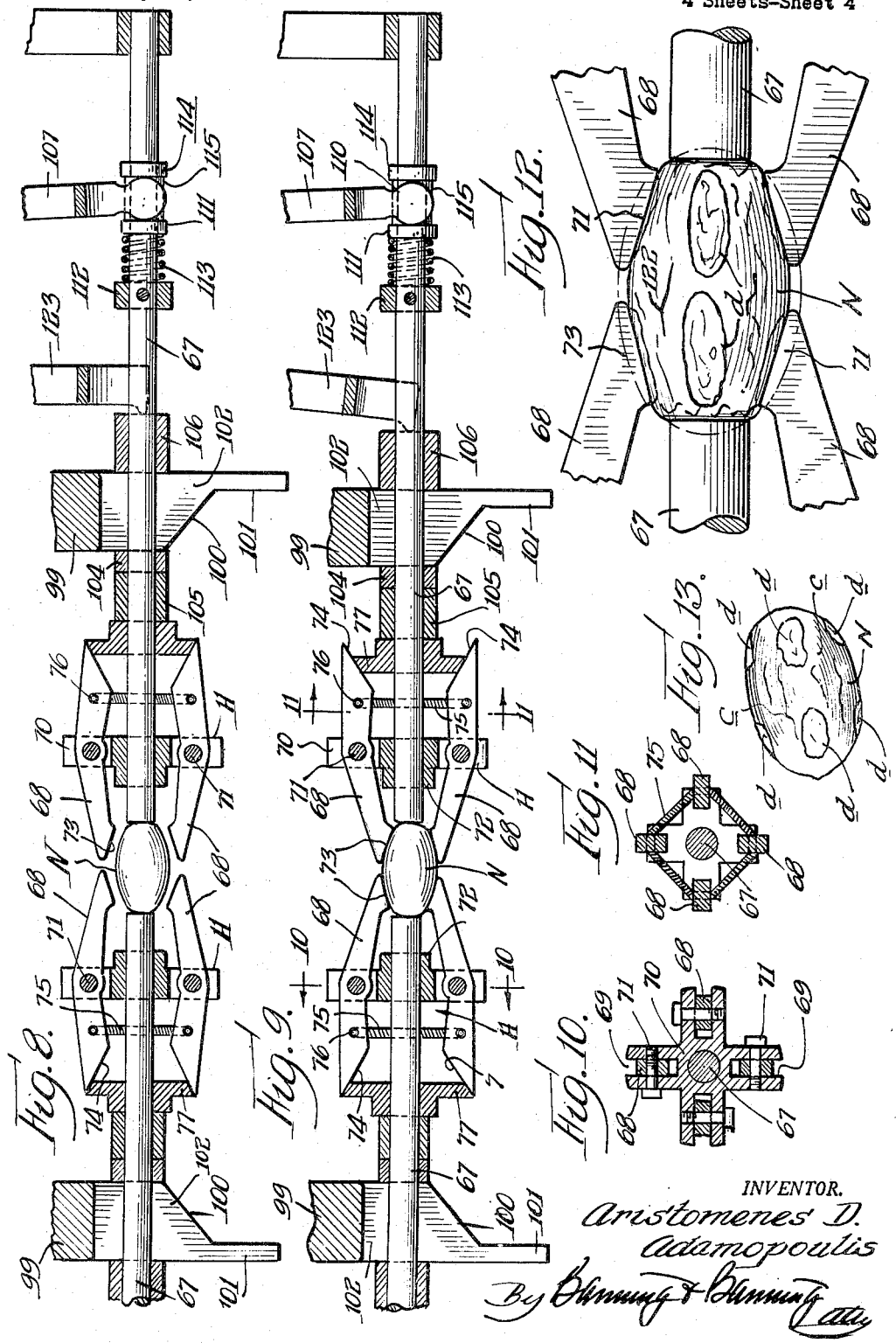

Patented Oct. 3, 1950

2,524,646

UNITED STATES PATENT OFFICE 2,524,646

NUT-CRACKING MACHINE

Aristomenes D. Adamopoulos, Chicago, Ill.

Application July 21, 1947, Serial No. 762,401

1 Claim. (Cl. 146—12)

This invention which relates in general to a nut cracking machine is adapted particularly for operation upon elongated nuts such as pecans although the same or a similar construction may be with advantage utilized for cracking nuts of other kinds and shapes as well.

An important object of the invention is to provide a nut cracking apparatus which will break the shells thoroughly in a number of places without unduly crushing the parts or mashing the nut meats within, so that they can be removed intact as relatively large pieces. A further object is to provide a nut cracking machine in which the operations are entirely automatic, the nuts being placed in a hopper from which they are fed, positioned, cracked, and then discharged through a short fall which tends to break them apart.

A still further object of the invention is to provide a machine of this kind which will engage pecans and similarly shaped nuts in a particular pattern to insure the most thorough breaking of the nuts without breaking of the meats into small pieces. A further object is to provide for the purpose noted a machine which is simple in operation and utilizing but a relatively few parts, but which is adapted to successively engage the nuts in a large number of places to crack them in an effective and efficient manner to facilitate extraction of the meats from the shells.

Other objects of the invention will appear in the ensuing description taken in conjunction with the accompanying drawings which illustrate a preferred embodiment of my invention in the manner following:

Fig. 8 shows a portion of the cracking mechanism in a position which follows that shown in Fig. 2;

Fig. 9 shows a portion of the cracking mechanism in the nut engaging position;

Fig. 10 is a section, taken on line 10—10 of Fig. 9;

Fig. 11 is a section, taken on line 11—11 of Fig. 9;

Fig. 12 is an enlarged fragmentary view in elevation, showing the manner in which the cracking heads engage with a nut; and Fig. 13 is a perspective view of a nut after being cracked in the machine.

Figure 1:
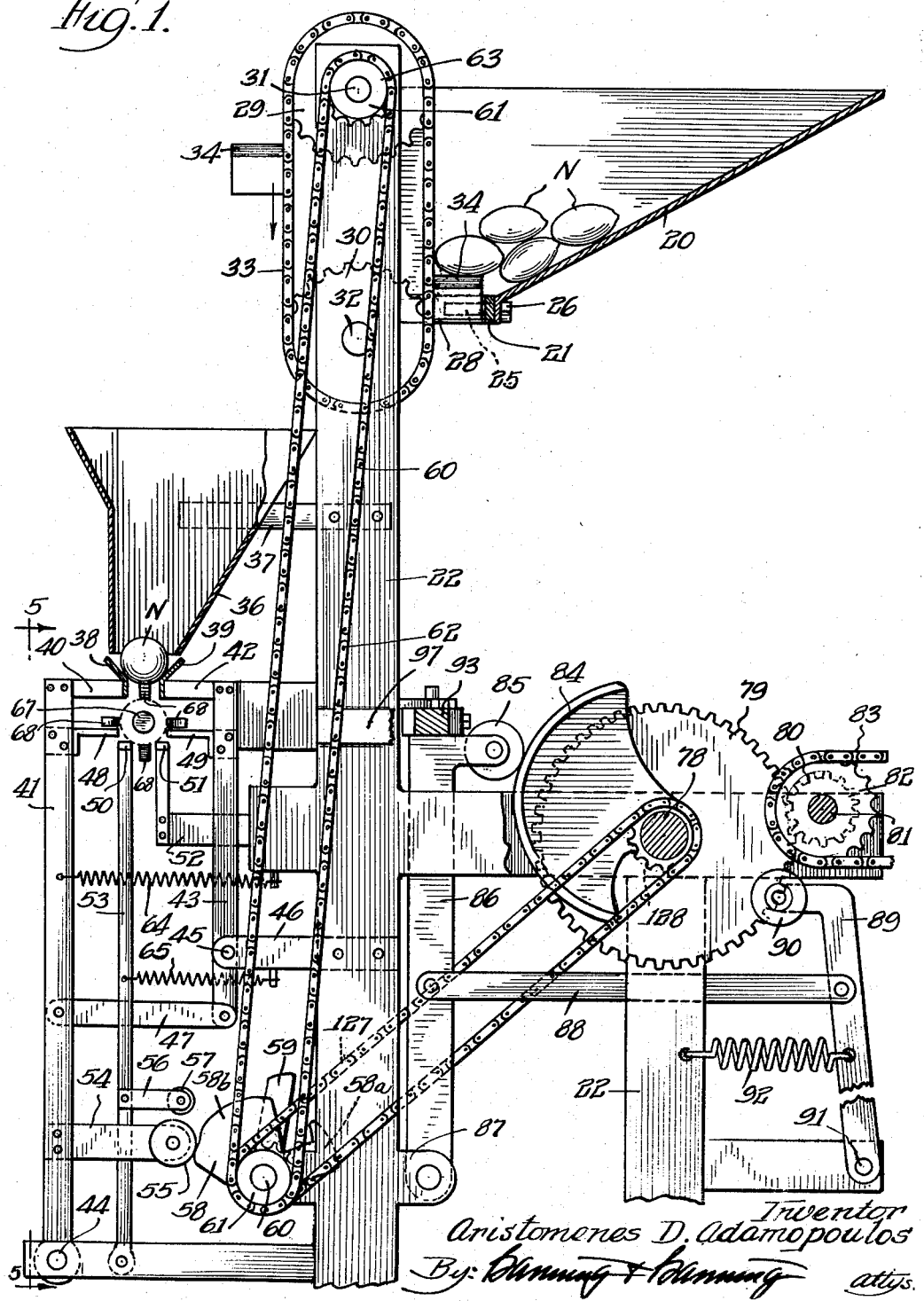
Fig. 1 is a vertical elevation of the machine, showing some of the parts in section.

Nut meats are now commonly sold after removal from their shells, and for certain kinds of nuts, such as pecans, the larger pieces, such as halves, command a higher sale price than the smaller fragments. To remove the halves, the shells must be carefully but accurately cracked, and without overcrushing. The machine of my invention not only feeds the nuts in a predetermined way, but also engages the nuts in a particular pattern of contacts to crack the nuts in the desired manner.

Referring now more particularly to the drawings, a hopper 20 with a downwardly converging bottom and sides is connected at its bottom to a cross piece 21 secured near the upper ends of upright side frames 22. The cross piece has a central angular offset 24 into which a short stem 25 projects. This stem may be threaded through the cross piece with a lock nut 26 to hold it adjustably in place. The offset into which the stem projects is not sufficiently large to permit nuts N to pass therethrough out of the hopper. The end wall of the hopper adjacent the frames is parallel thereto and has a bottom slot 28 therein extending above the offset 24 but not wide enough for a nut to pass downwardly therethrough.

Sprocket wheels 29 and 30 are carried upon parallel cross shafts 31 and 32, respectively, mounted between the upper ends of the side frames 22. The wheels are connected by a sprocket chain 33 movable adjacent the slot 28 in the hopper. Spaced lift arms 34 are secured in pairs to opposite sides of the chain extending outwardly therefrom into the slot openings 28 at opposite sides of the stem 25, and are freely movable upwardly through the bottom slot of the hopper.

Nuts within the hopper will gravitate to the bottom opening where they are prevented from dropping out by the stem 25. As the adjacent run of the chain moves upwardly, the lift arms 34 which are spaced apart to pass the stem will engage a nut N between them, carrying it over the top of the chain. To seat the nut more firmly upon the arms 34 their upper edges may have outwardly turned flanges 35.

A feeding funnel 36 located below the chain 33 at the side of the frame opposite the hopper is supported at each end by a bar 37 which connects it with the adjacent upright frame 22. The funnel is shaped to position a nut N horizontally endwise with its long dimension parallel to the cross shafts 31 and 32.

At the bottom of the feeding funnel are two parallel nut supports 38 and 39 with outwardly flaring upper portions to provide between them a seat for nuts that are to be supported in a fixed position. One support 38 is connected by an arm 40 with the upper end of a lever 41, and the other support 39 is connected by an arm 42 with the upper end of a lever 43. The lower end of the lever 41 is pivoted at 44 to the frame 22, and the lever 43 is pivoted at 45 near its lower end upon an arm 46 extending from the frame. The lower end of the lever 43 is pivoted to one end of a link 47 whose other end is pivoted to the lever 41 intermediate its ends.

Near the tops of the levers 41 and 43 are inwardly extending nut supports 48 and 49 directly below the supports 38 and 39, respectively, spaced therefrom less than the smallest dimension of the nuts to be cracked, and positioned to successively engage each nut along its opposite sides horizontally thereof. Another pair of nut supports 50 and 51 parallel to the supports 38 and 39, are located below the nut N when engaged by the supports 48 and 49. The support 51 is held by an arm 52 in fixed position with respect to the frame 22, and the other support 50 is carried at the top end of a lever 53 pivoted on a lower portion of the frame.

Near its lower end the lever 41 has a fixed arm 54 with a contact roller 55 at the outer end, and the lever 53 which is substantially parallel with the lever 41 has a fixed arm 56 near its lower end with a contact roller 57 at its outer end. These levers 41 and 53 are rocked by cams 58 and 59 respectively, both mounted on a shaft 60 mounted in the side frame 22.

The cam 58 has two projections 58a and 58b to engage the contact roller 55, the projection 58a having a relatively short period of engagement with this roller and being spaced about three-quarters of one rotation of the cam ahead of the longer engaging projection 58b. The cam 59 which engages the contact roller 57 for the other lever 53, closely follows or slightly overlaps the projection 58b in its relative timing. During the interval between engagement of the projections 58a and 58b, the nut cracking operation takes place, and in the other interval, including engagements of these projections, the nut is fed from the bottom of the funnel for discharge from the position wherein it was subjected to cracking.

Also secured to the shaft 60 is a sprocket wheel 61 engaging a sprocket chain 62 which also passes around a sprocket wheel 63 on the shaft 31 at the tops of the side frames 22. When the shaft 60 is rotated, it causes the nuts N to be fed automatically from the hopper 20 by moving the chain 33 on its sprockets, thereby carrying the lift arms 34 and any nuts lodged thereon over the top sprocket 29, and discharging the nuts into the feeding funnel 36. At the bottom of the funnel the nuts are horizontally positioned by the supports 38 and 39. As the lever 41 is rocked outwardly by engagement of the cam 58a with the roller 55, the lever 43 is rocked by its connecting link 47 in an opposite direction. This separates the nut supports 38 and 39 so that a nut N may drop between them to a lower position upon the lower supports 50 and 51. The movable nut supports for the upper and lower positions are returned to their effective positions, after the nuts are dropped, by a spring 64 connected at one end to the lever 41 and at the other end to a fixed portion of the frame 22.

After each unit cracking operation, the cam projection 58b engages the operating roller 55 of the lever 41, and again rocks it and the connected lever 43, thereby separating the upper nut supports 38 and 39 and the lower side nut supports 48 and 49. As there is no nut upon the upper supports 38 and 39 at this time, only the lower supports 48 and 49 are effective to do any work. At this time the lever 53 is rocked by engagement of its contact roller 57 with the cam 59, which moves the bottom nut support 50 outwardly at one side of the nut, thus leaving only the fixed support 51 at one side of the bottom of the nut. Since the position of the support 51 is off-center, the cracked nut is then free to drop clear of the other supports, and before the lever support 50 is returned to its operating position in response to tension of a spring 65 connected thereto.

A nut N is first supported at the bottom of the funnel 36 on the nut supports 38 and 39, and later is dropped to the lower or cracking position in which the nut is held between the lower side supports 48 and 49 upon the bottom supports 50 and 51. In the cracking position, the nuts are disposed between a pair of axially aligned cracking heads H, each mounted for inward movement with similar operating mechanism for both heads so that the description of one head applies also to the other.

Each cracking head H is mounted upon an endwise movable shaft 67, and comprises four fingers 68 pivoted intermediate their ends, at equidistant angles around the shaft, in slots 69 of a plate 70, upon pivot bolts 71. The plate is secured to a collar 72 pinned to the shaft limiting the endwise movement of the plate and arms and also holding the fingers against rotation about the shaft.

One end of each finger 68 has an inclined nut engaging head 73 and the other end has an inner beveled edge 74. A coil spring 75 connected through a hole 76 near the beveled edge of each finger tends to spread the opposite heads 73 outwardly. A beveled wedging collar 77 on the shaft 67 is movable against the beveled edges 74 to press the heads 73 inwardly against the action of the spring 75.

The fingers 68 are spaced equally apart and are held relatively in that position on the shaft 67 to extend above, below, and at both sides of a nut N when held in the lower cracking position by the supports 48, 49, 50, and 51. These supports are arranged, as shown in Fig. 1, so that they are out of endwise alignment with the fingers 68 and neither conflicts with the movement or operation of the other.

To engage a nut, the shaft 67 is moved endwise and the fingers 68 of the cracking head H are moved inwardly at the ends of the shaft. This is accomplished by mechanism mounted upon and in connection with a driving shaft 78 parallel with the shafts 67 and mounted in a lateral portion of the side frames 22. This shaft 78 is constantly rotated by a gear 79 secured fast thereto and meshing with a driving pinion 80 secured to a countershaft 81 also mounted in the side frames 22. This countershaft is driven in any suitable manner as by means of a sprocket wheel 82 secured thereto and rotated by a driving chain 83 from a power source (not shown).

Figure 2:
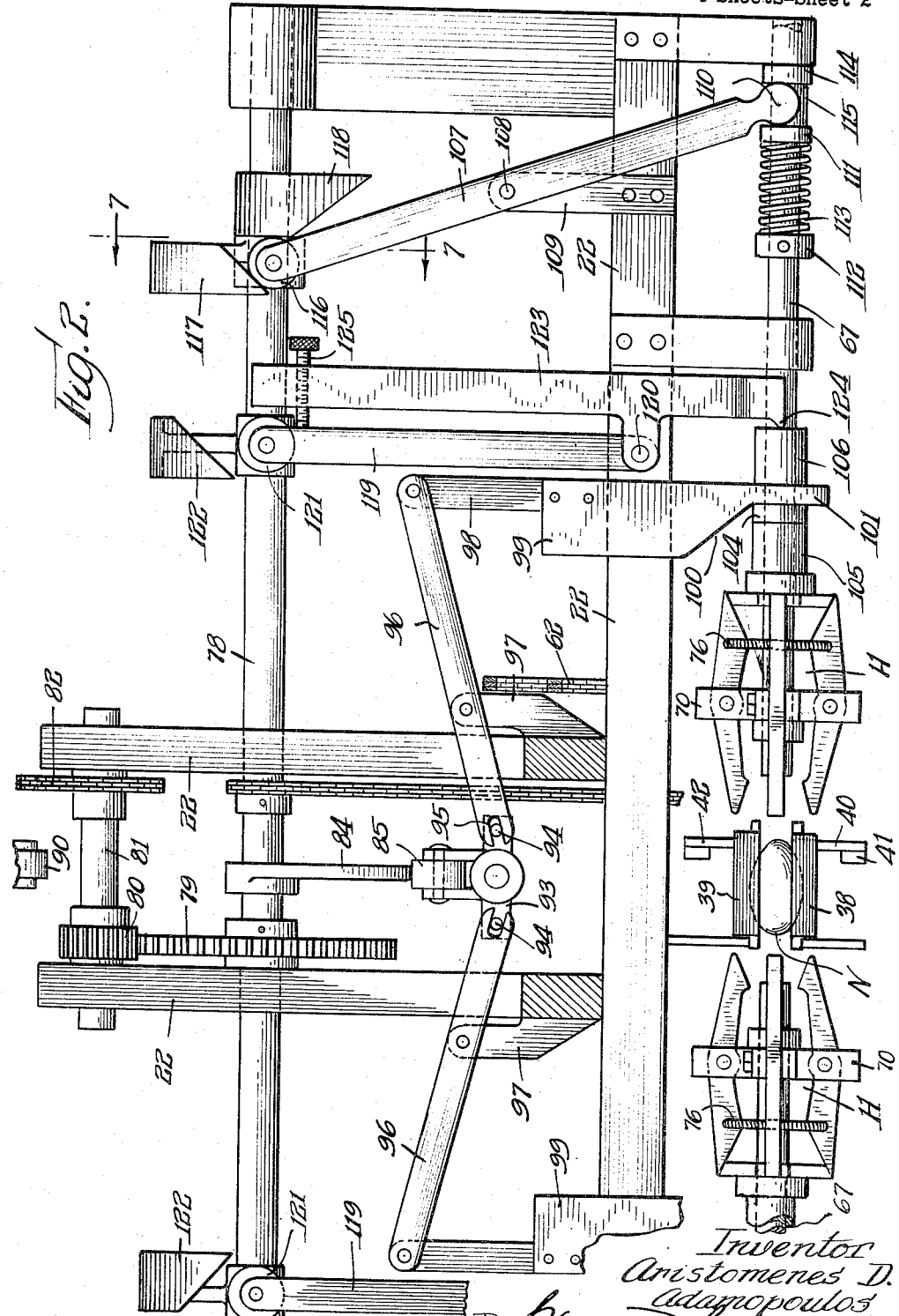
Fig. 2 is a partial plan view of the operating and cracking mechanism.
Figure 3:
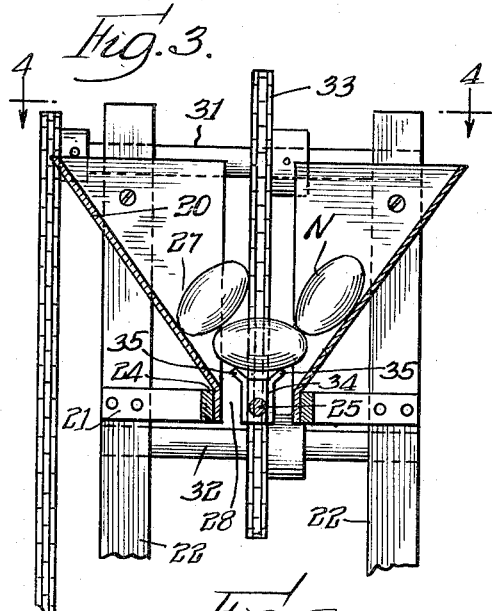
Fig. 3 is a sectional view, taken on line 3—3 of Fig. 4.
Figure 4:
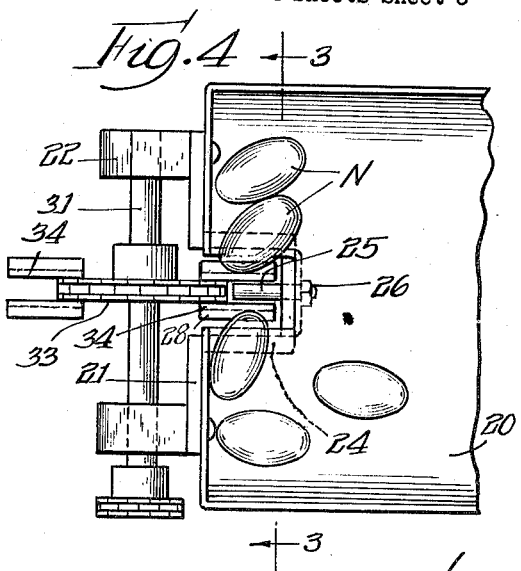
Fig. 4 is a plan view, looking down from line 4—4 of Fig. 3.
Figure 5:
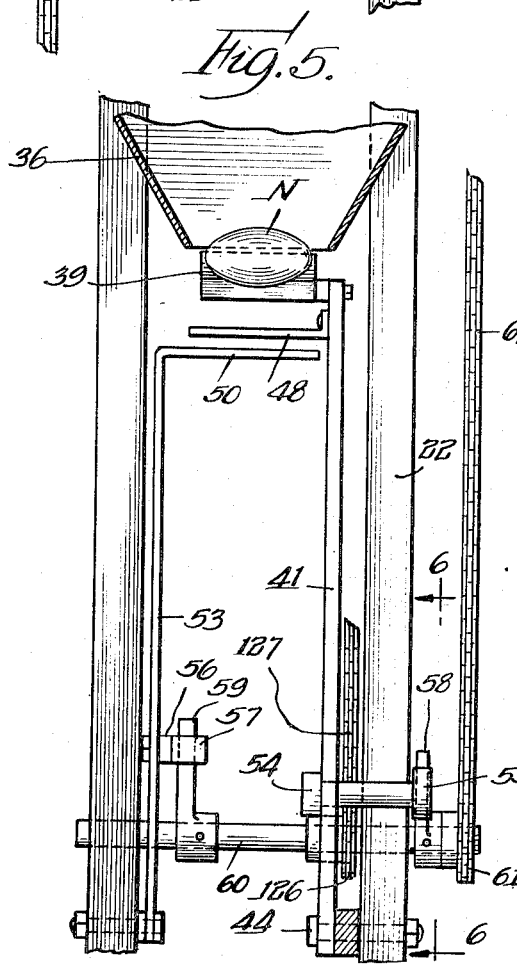
Fig. 5 is a sectional view taken on line 5—5 of Fig. 1, showing the nut feeding mechanism.
Figure 7:
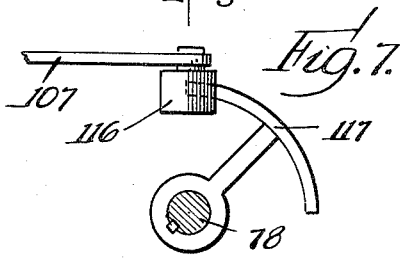
Fig. 7 is a sectional view, taken on line 7—7 of Fig. 2.
Figure 6:
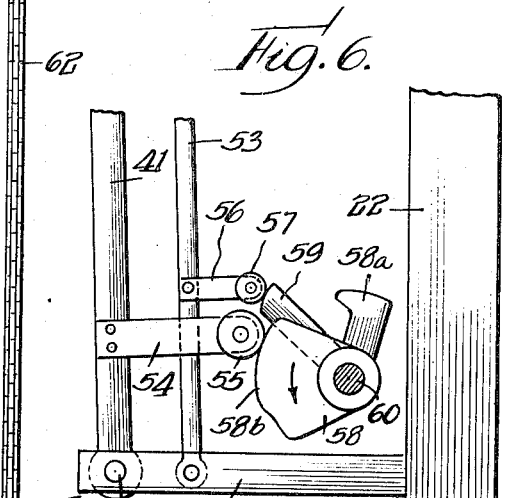
Fig. 6 is a fragmentary sectional view, taken on line 6—6 of Fig. 5.

Continuous rotation of the shaft 78 rotates a segmental cam 84 adapted to engage a roller 85 carried by the upper end of an upright lever 86 pivoted at its lower end in ears 87 projecting from one of the side frames. This lever is connected by a link 88 with another lever 89 having a roller 90 at its upper end and located at the opposite side of the driving shaft 78, but also engaged by the segmental cam 84. The lever 89 is mounted at its lower end upon a pivot 91 in the frame and this lever and the connected lever 86 are pressed toward the upright portion of the frame by a spring 92 connected at one end to the lever 89 and at the other end to a fixed portion of the frame. At the top of the lever 86 is a cross head 93 (see Fig. 2) having projecting pins 94 on opposite sides each engaging a slot 95 in one end of a lever 96 pivoted intermediate its ends upon a projection 97 of the side frame. The other end of each lever 96 has an arm 98 connecting it to a wedge 99 having an inclined wedging surface 100 near its outer end. At the end of the wedge is a narrow flat portion 101 and a slot 102 extends inwardly from the end and beyond the wedging surface 100 so that it may extend on opposite sides of the shaft 67.

At one side of the flat portion 101 are collars 104 and 105 movable on the shaft 67 and into engagement with the wedging collar 77 which is also movable upon the shaft. At the other side of the wedge 99 is a collar 106 also movable upon the shaft 67 so that the wedge 99 slides between the collars 104 and 106, the latter collar being held in position and the wedging surface 100 forcing the wedging collar 77 inwardly upon the inner beveled edges 74 of the fingers 68. This causes the finger heads 73 to be pressed against a nut N for cracking it.

Each shaft 67 is movable endwise by means of a lever 107 having a pivot 108 intermediate its ends supported upon a bracket 109 attached to the frame 22. At one end is a rounded extremity 110 for engaging a collar 111 loose upon the shaft 67 and spaced from a collar 112 fixed to the shaft by an extended coil spring 113. The collar 111 is preferably connected to a collar 114 at the other side of the rounded extremity 110 by a reduced sleeve 115 for seating this rounded extremity thereon between the collars 111 and 114.

At the other end of the lever 107 is a roller 116 adapted to engage a cam 117 secured to the shaft 78 for rocking the opposite end of the lever to move the shaft 67 resiliently endwise against the tension of the spring 113. Also secured to the shaft 78 is a cam 118 to engage the roller 116 to move the lever 107 and the shaft 78 in the reverse direction.

Thus the two coaxial shafts 67 are moved endwise into engagement with the ends of a nut N, carrying with the shafts the cracking heads H until they overlap the ends of the nut and then, by the application of the wedges 99, the wedging collars 77 are forced inwardly at the beveled ends of the fingers 68 whereby to force the nut engaging heads 73 into pressure contact with the nut.

To operate upon nuts of various size, the movement of each shaft 67 and the movement range of each wedge 99 may require adjustment. This may be effected by an arm 119 mounted at one end upon a pivot 120 carried by the frame adjacent the shaft 67 and having a roller 121 at its other end adjacent the shaft 78, adapted to be engaged by a cam 122 secured to the shaft. Also mounted upon the same pivot 120 is a lever 123 having a projection 124 at one end for engaging the collar 106 at one side of the wedge 99. At the other end of this lever is a set screw 125 extending through the lever 123 and into the arm 119 near the roller 121. With this construction, the adjustment of the set screw 125 will vary the distance of the adjacent end of the lever 123 from the arm 119, thereby producing a corresponding variation in the position of the contact projection 124, thus axially advancing or withdrawing the shaft 67 and correspondingly varying the position of the wedge 99. The wedges are positively moved into engaging position when the cam 84 is engaged by the roller 90; the wedges are moved away from engaging position when the cam is engaged by the other roller 85.

The timing and operation of the driving mechanism is such that the feeding and cracking operations are continuous and consecutive. To connect the nut positioning parts operated by the shaft 60 for timed operation with the nut engaging and cracking parts, a sprocket wheel 126 secured to shaft 60 is connected by a sprocket chain 127 with a sprocket wheel 128 on the shaft 78. Nuts fed from the hopper are successively positioned by the funnel 36 upon the upper supports 38 and 39; each nut in turn then drops down to rest upon the lower supports 50 and 51; the nut cracking heads H are then advanced by opposite axial movements of the shafts 67 into engagement with the extremities of the nut, and concurrently operate to force the acting heads of the fingers 68 into pressure engagement with opposite end portions of the nut N at points removed from their extremities (see Fig. 12). In such a compression of a nut—a pecan, for example—the contact of the shaft ends and the cracking heads H produce depressions $d$ in the surfaces engaged, and also cracks $c$ between the surfaces, depending of course upon the adjustment of the cracking members which may be varied, as desired, for nuts of different sizes so that the shells will be broken and cracked but without crushing the nut. Thus when the cracking heads H and the shafts 67 are disengaged from the nut, the latter is free to drop from its position upon the then-separated supports 50 and 51. The fall of the nut may further break the shell apart so that the nut meats are well exposed and loosened, whereby to require very little picking in the separation of the meats from the shells.

While a preferred embodiment of the invention has been described in detail, it should be regarded by way of example and illustration, and not as a limitation or restriction of the invention, as various changes in the construction, combination, and arrangement of the parts may be made without departing from the spirit and scope of the invention.

I claim:

In a cracking machine for pecans and the like, a pair of aligned shafts spaced apart, means for supporting a nut between the shafts, a cracking head near the inner end of each shaft, means on each cracking head to compressively engage a nut between the ends thereof, means for moving the shafts endwise to compressively engage the opposite ends of a nut, operating means on each shaft to actuate the cracking head, a wedge to move the operating means relative to the shaft when it is moved endwise, a driving shaft having a cam thereon, a pair of levers on opposite sides of the cam, a link connecting the levers for joint movement and engaged by the cam for moving them oppositely, a crosshead carried at the top of one of the levers, and a lever pivoted between its ends with one end engaging the crosshead and the other end engaging the wedge and operative to move it back and forth as the link connected pair of levers are engaged by the cam.

ARISTOMENES D. ADAMOPOULOS.

REFERENCES CITED

The following references are of record in the file of this patent:

UNITED STATES PATENTS

| Number | Name | Date |
| --- | --- | --- |
| 947,932 | Peckham | Feb. 1, 1910 |
| 1,208,324 | Jones | Dec. 12, 1916 |
| 1,240,657 | Bolick | Sept. 18, 1917 |
| 1,265,350 | McFarland | May 7, 1918 |
| 1,372,293 | Jones | Mar. 22, 1921 |
| 1,402,234 | Jones | Jan. 3, 1922 |
| 1,724,049 | Smith | Aug. 13, 1929 |
| 1,965,460 | Gebhardt | July 3, 1934 |
| 1,973,295 | Schreeber | Sept. 11, 1934 |
| 2,226,475 | LaFerney | Dec. 24, 1940 |